United States Patent
Hogan et al.

(10) Patent No.: US 9,701,225 B1
(45) Date of Patent: Jul. 11, 2017

(54) CONVERTIBLE TAILGATE COVER AND SEAT

(71) Applicant: Switchback Outdoor Products LLC, Erie, CO (US)

(72) Inventors: Michael Hogan, Erie, CO (US); Timothy Crowley, Arvada, CO (US); Zachary Harlow, Longmont, CO (US)

(73) Assignee: Switchback Outdoor Products LLC, Erie, CO (US)

( * ) Notice: Subject to any disclaimer, the term of this patent is extended or adjusted under 35 U.S.C. 154(b) by 0 days.

(21) Appl. No.: 15/217,004

(22) Filed: Jul. 22, 2016

Related U.S. Application Data

(60) Provisional application No. 62/196,835, filed on Jul. 24, 2015.

(51) Int. Cl.
| | | |
|---|---|---|
| *B60N 2/30* | (2006.01) | |
| *A47C 4/52* | (2006.01) | |
| *B60R 13/01* | (2006.01) | |
| *B62D 33/027* | (2006.01) | |

(52) U.S. Cl.
CPC ............ *B60N 2/3095* (2013.01); *A47C 4/52* (2013.01); *B60N 2/3097* (2013.01); *B60R 13/01* (2013.01); *B62D 33/0273* (2013.01); *B60R 2013/016* (2013.01)

(58) Field of Classification Search
CPC ............ B60R 2013/016; B60N 2/3097; B62D 33/0273; A47C 1/146; A47C 4/52
USPC .................................................. 296/69, 57.1
See application file for complete search history.

(56) References Cited

U.S. PATENT DOCUMENTS

| | | | | |
|---|---|---|---|---|
| 4,842,329 | A * | 6/1989 | Owens | A47C 7/021 297/188.01 |
| 5,215,346 | A | 6/1993 | Reitzloff et al. | |
| 5,516,193 | A * | 5/1996 | Simpson | A47C 4/52 297/188.01 |
| 5,868,449 | A | 2/1999 | Hitchcock | |
| 5,971,464 | A | 10/1999 | Davis et al. | |
| 5,975,610 | A | 11/1999 | Tracy | |
| 6,116,676 | A * | 9/2000 | Edwards | B60N 2/3011 296/64 |
| 6,273,504 | B1 | 8/2001 | Pace et al. | |
| 6,286,885 | B1 | 9/2001 | Ramos | |
| 6,695,556 | B2 | 2/2004 | Addy | |

(Continued)

*Primary Examiner* — Ruth Ilan
(74) *Attorney, Agent, or Firm* — Invention to Patent Services; Alex Hobson

(57) ABSTRACT

A convertible tailgate cover can be converted from simply a tailgate cover to a seat and has a tailgate cover portion that includes an inside cover portion configured to extend over an inside surface of a tailgate and an outside cover portion configured to extend over an outside surface of said tailgate. The tailgate cover portion forms a U-shape having a channel that enables the tailgate cover portion to be slid down over a tailgate. A convertible tailgate cover has a seat-back portion that is rotatably attached to the inside cover portion and can be rotated up and secured by seat-back straps to form a seat-back, when the tailgate is down. The seat-back may have several pads configured in an accordion that fold out to form a sleeping pad. The tailgate cover portion and seat-back portions may be padded to provide a comfortable seat and to prevent tailgate damage.

17 Claims, 12 Drawing Sheets

(56) References Cited

U.S. PATENT DOCUMENTS

| | | | |
|---|---|---|---|
| 7,438,356 B2 * | 10/2008 | Howman | ............... A47C 7/021 297/17 |
| 8,528,976 B2 | 9/2013 | Wimberley | |
| 8,602,481 B2 | 12/2013 | Sierra | |
| 9,211,012 B1 | 12/2015 | Wilson, II et al. | |
| 2004/0084927 A1 * | 5/2004 | Brown | ............... B62D 33/0273 296/65.16 |
| 2008/0203752 A1 | 8/2008 | Warkentin | |

* cited by examiner

CONVERTIBLE TAILGATE COVER AND SEAT

CROSS REFERENCE TO RELATED APPLICATIONS

This application claims the benefit of priority to U.S. provisional patent application No. 62/196,835 filed on Jul. 24, 2015; the entirety of which is hereby incorporated by reference.

FIELD OF THE INVENTION

The invention relates to convertible tailgate covers, and particularly to those that cover the tailgate for gear, such as bicycle, transport and that convert to a seat.

BACKGROUND

Protective tailgate covers are commonly used on trucks for outdoor sporting pursuits such as bicycling and surfing, allowing gear to be easily and safely transported in the bed of a pickup truck. The pad is attached to the tailgate and prevents damage to the tailgate as well as protecting the sporting equipment when loading and transporting. The invention proposed herein is an improvement over the prior art in that it provides additional function as a seating apparatus, providing a comfortable seat and backrest on the tailgate.

Protective tailgate pads are well established in the marketplace and have been commercially available for years (Dakine, Yakima, Softride, Evoc, Thule and RaceFace are examples of currently commercially available product). In the established configuration, the pad consists of two "flaps", or a single flap that wraps in a C shape around the tailgate, with a first portion of the flap (or half) covering the front and the second portion covering the rear of the tailgate. The pad attaches to the tailgate of a truck using straps, snaps, dips or other attachment apparatus. The pad provides a protective barrier between the sporting equipment being transported and the tailgate, thereby preventing damage to both. The soft surface can also prevent the equipment from shifting and sliding during transport as opposed to the hard surface of a normal tailgate. Shifting can also be eliminated with fixing straps implemented into the pad. Several bicycles and/or surfboards can be loaded in one pick up, making it an attractive alternative to a hitch or roof style rack. These covers provide simplicity, lower cost and easier loading versus other recreational gear racks and therefore appeals to many users.

SUMMARY OF THE INVENTION

The invention is directed to a convertible tailgate cover that can be converted from simply a tailgate cover to a seat. In an exemplary embodiment, the convertible tailgate cover is converted to a seat wherein the tailgate is the seat portion of the seat, or to a seat wherein the tailgate is a back-rest portion of a seat. In an exemplary embodiment, the convertible tailgate cover can be converted to a standalone seat, whereby the convertible tailgate cover is not configured around the tailgate and may be placed in the bed of the truck or on the ground, for example. In still another embodiment, the convertible tailgate cover comprises a multi-fold seat-back having a plurality of seat-back pads that can be folded out to form an extended seat or a sleeping pad. The convertible tailgate cover provides multiple functions through various configurations and orientations of the seat-back pad with respect to the tailgate cover portion.

An exemplary convertible tailgate cover comprises a tailgate cover portion that comprising an inside cover portion configured to extend over an inside surface of a tailgate and an outside cover portion configured to extend over an outside surface of said tailgate. A coupling portion is configured to extend over an extended end of said tailgate and between the coupling ends of the inside cover portion and the outside cover portion. The tailgate cover portion forms a U-shape having an opening that enables the tailgate cover portion to be slid down over a tailgate. Retainer strap(s) may be attached to the inside cover portion and extend under the tailgate where they attach to outside cover portion to retain the convertible tailgate cover to the tailgate. The outside cover portion extends from a coupling end, wherein it is coupled to the coupling portion and an extended bumper end, that extends down towards the bumper of a truck when configured over a tailgate. The inside cover portion extends from a coupling end, wherein it is coupled to the coupling portion and a hinge end, wherein it is coupled with the seat-back portion. An exemplary convertible tailgate cover extends along and over a substantial portion of the length of the tailgate, such as about 60% or more of the length of the tailgate or more, about 75% or more of the length of the tailgate or more, about 90% or more of the length of the tailgate or more and any length between and including the lengths provided. An exemplary convertible tailgate cover, or tailgate cover portion, may have a length that is about 30 inches or more, about 36 inches or more, about 40 inches or more, about 48 inches or more and any length between and including the length values provided.

A convertible tailgate cover comprises a seat-back portion extending to an extended end from a hinge portion that couples the seat-back portion to the hinge end of the inside cover portion. The seat-back portion may be held in a folded away orientation from the tailgate cover portion by a plurality of seat-back straps. For example, when the convertible tailgate cover is configured over a tailgate and the tailgate is down, extending out substantially horizontally from the bed of the truck or vehicle, and the seat-back portion is rotated up about the hinge portion to provide a seat-back, the seat-back straps may retain the seat-back in position when someone sits with their back against the seat-back portion. The seat-back portion comprises a seat-back pad, that extends along at least a portion of the length of the seat-back portion to provide comfortable seating. The seat-back straps are also used to support the seat-back up in a seat-back orientation when the convertible tailgate cover is in a standalone seat configuration, with the tailgate cover acting as a seat, for example. The seat-back straps may extend from the tailgate cover portion, such as proximal to the coupling end of the inside cover portion, or from the coupling portion, to the extended end of the seat-back portion. The straps may comprise a length adjustment feature that enables the seat-back portion to be retained in a vertical or reclined orientation, as desired. An adjustment feature may be a buckle, for example.

In an exemplary embodiment, the seat-back portion is a multi-fold seat-back comprising a plurality of seat-back pads that are coupled together to allow the plurality of seat-back pads to be folded out, to form an extended seat-back. In an exemplary embodiment, the plurality of seat-back pads are coupled together in an accordion manner, whereby the plurality of seat-back pads can be folded up in an accordion fold, wherein the pads are connected along the ends to each other. A multi-fold seat-back enables the seat-back portion to extend out from the tailgate cover portion to form an extended padded area, such as for sleeping, wherein the convertible tailgate cover is configured as a sleeping pad. In an exemplary embodiment, the convertible tailgate cover is configured over a tailgate with the tailgate up and the multi-fold seat-back is unfolded to extend into the bed of the truck, thereby forming a comfortable sleeping pad. In an exemplary stand-alone sleeping pad configuration, the tailgate cover portion may be laying on the ground or leaning against a support to provide a head rest or pillow and the extended multi-fold seat-back may act as sleeping pad. In an exemplary seat configuration, the tailgate cover portion is configured over the tailgate and the tailgate is down, and the multi-fold seat-back is extended into the bed of the truck with the seat-back pad laying in the bed and the first integral pad rotated up vertically from the bed of the truck to form a seat back. Seat-back straps retain the first integral pad in the upright orientation to provide support for the seat back.

The inside cover portion, outside cover portion, seat-back portion or an individual pad of a multi-fold seat-back may be planar having planar axis that is parallel with the tailgate, when configured over a tailgate. In addition, the inside cover portion, outside cover portion, seat-back portion or an individual pad of a multi-fold seat-back may comprise a padding material, to protect the tailgate when an article is coupled thereto and/or to provide comfort when configured as a seat or a sleeping pad. A padding material may comprise batting, foam, elastomer, beads and the like. A single layer of woven or non-woven fabric would not be considered a padding, for the purposes of this invention, as it most likely would not provide enough protection or padding as required. In an exemplary embodiment, a padding material, such as foam, is configured within a retaining material, such as fabric pouch. The inside cover portion, outside cover portion, seat-back portion or an individual pad of a multi-fold seat-back may have a minimal thickness that is 0.2 inches or more, 0.3 inches or more, 0.5 inches or more an any thickness between and including the values provided. In still another embodiment the inside cover portion, outside cover portion, seat-back portion or an individual pad of a multi-fold seat-back comprises a bladder that is filed with a fluid and/or may be configured to be filled with a fluid, such as air, whereby a port is configured to allow a person to inflate the bladder to a desired level for comfort. A bladder type pad may be only on the seat-back portion or pads of the seat-back portion. The inside cover portion, outside cover portion, seat-back portion or an individual pad of a multi-fold seat-back may be flexible, wherein they can be folded at least one time along the length wherein the left end and right end are folded to each other.

An exemplary convertible tailgate cover may comprise a rigid support member that extends across the seat-back portion from a left side to a right side. When the convertible tailgate cover is configured in a seat configuration, the seat-back portion may buckle when a person leans onto the seat-back portion without a support member. A support member may be detachable from the seat-back portion, to allow the entire convertible tailgate cover to be folded along the length for storage. A support member may be attached to the seat-back portion, such as by insertion into a pouch or sleeve, for example.

The convertible tailgate cover may comprise an attachment feature configured to retain the extended end of the seat-back portion to the tailgate cover portion, such as to the coupling portion or to the outer face of the inside cover portion. An attachment feature may comprise a zipper or a hook-and-loop fastener, for example. An attachment feature may extend around a portion of the perimeter of the seat-back portion, or around the entire non-attached perimeter wherein it extends from the coupling portion up along a left side, across the extended end or top, and down the opposing right end to the coupling portion. An attachment feature that extends around the entire non-attached perimeter of the seat-back portion, or first pad of the seat-back portion forms a closable pocket between the seat-back portion and the inside cover portion. Any number of personal items may be stored in the closable pocket including, cloths, tools and the like. In addition, an exemplary convertible tailgate cover may comprise an integral cup-holder that is attached within the pocket, such as to the inside cover portion, and is stowed within said pocket in a stowed configuration and extends out from said pocket to a deployed configuration to hold a beverage therein. When the convertible tailgate cover is configured over the tailgate and the tailgate is down, the cup holder may be pulled from the pocket wherein the cup holder would extend out from the end of the tailgate to hold a beverage in a convenient location when sitting on the tailgate. An integral cup holder may preferably comprise a foam cylindrical member that will keep a beverage cold or hot when configured therein. In addition, a foam cup-holder will more easily compress and stow inside the pocket. An exemplary convertible tailgate cover may also comprise an integral foot rest that is attached to the convertible tailgate cover, such as within the pocket, or to the inside cover potion, and is stowed within said pocket in a stowed configuration and extends out from said pocket to a deployed configuration from said pocket to support a person's feet when sitting on the back of a tailgate. Many people find sitting on a tailgate with their legs hanging uncomfortable after a period of time as the weight of their legs causes pain where their upper legs or buttocks rest on the tailgate, or convertible tailgate cover. An exemplary foot rest may comprise a strap of material and a length adjustment feature to further set a comfortable foot rest position.

A method of converting a convertible tailgate cover from a tailgate cover to a seat comprises the steps of, folding out the seat-back portion from the inside cover portion. An attachment feature may have to be detached or opened prior to rotating the seat-back portion away from the inner cover portion about the hinge end of the seat-back portion. When the tailgate is up, simply folding the seat-back portion down into the bed of the truck forms a seat, wherein the seat-back portion is the seat and the inside cover portion, supported by the tailgate is the seat back. The tailgate may be partially opened, or rotated out from the bed of the truck and a seat-back strap or straps may be used to retain the tailgate in a reclined position, wherein a person sits reclined with their back against the inside cover portion on the reclined tailgate and on the seat-back portion within the bed of the truck. It is to be noted, that when the seat-back portion is a multi-fold seat-back, a first integral pad may be folded out from the seat-back pad, coupled to the inside cover portion, to form an extended seat, or a sleeping pad. A multi-fold seat-back may comprise a first, second and third integral pad. When the tailgate is opened completely, the seat-back straps may retain the seat-back portion in an upright position, wherein a person now sits on the inside cover portion of the tailgate cover portion with their back resting against the seat-back portion.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
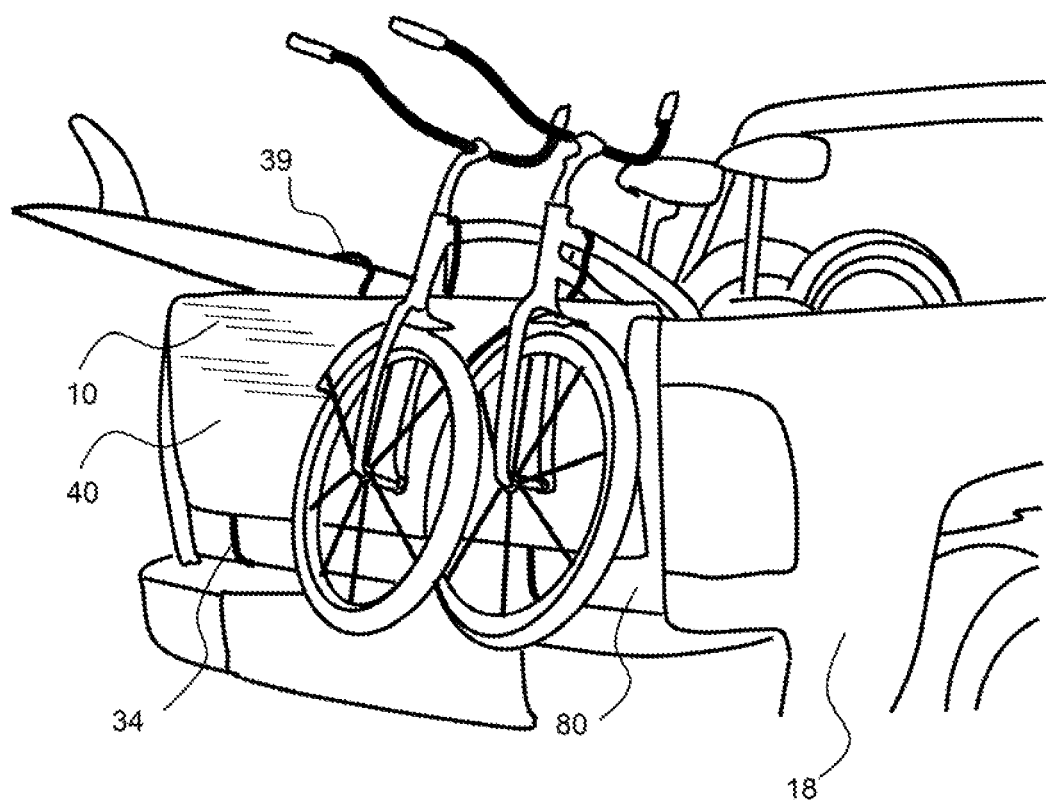
FIG. 1 shows an exemplary convertible tailgate cover configured over a tailgate with sporting gear attached thereto.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention. It is to be understood that some features are not shown with reference numbers in all of the figures for ease of illustration.

As used herein, the terms "comprises," "comprising," "includes," "including," "has." "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

As shown in FIG. 1, an exemplary convertible tailgate cover 10 is configured over a tailgate 80 with sporting gear, bicycles and a surfboard, attached thereto by gear straps 39. The tailgate cover portion 12, comprises the outside cover portion 40 that extends over the outside surface of the tailgate 80. Retainer straps 34 extend under the tailgate where they attach to the inside cover portion to retain the tailgate cover to the tailgate.

Figure 2:
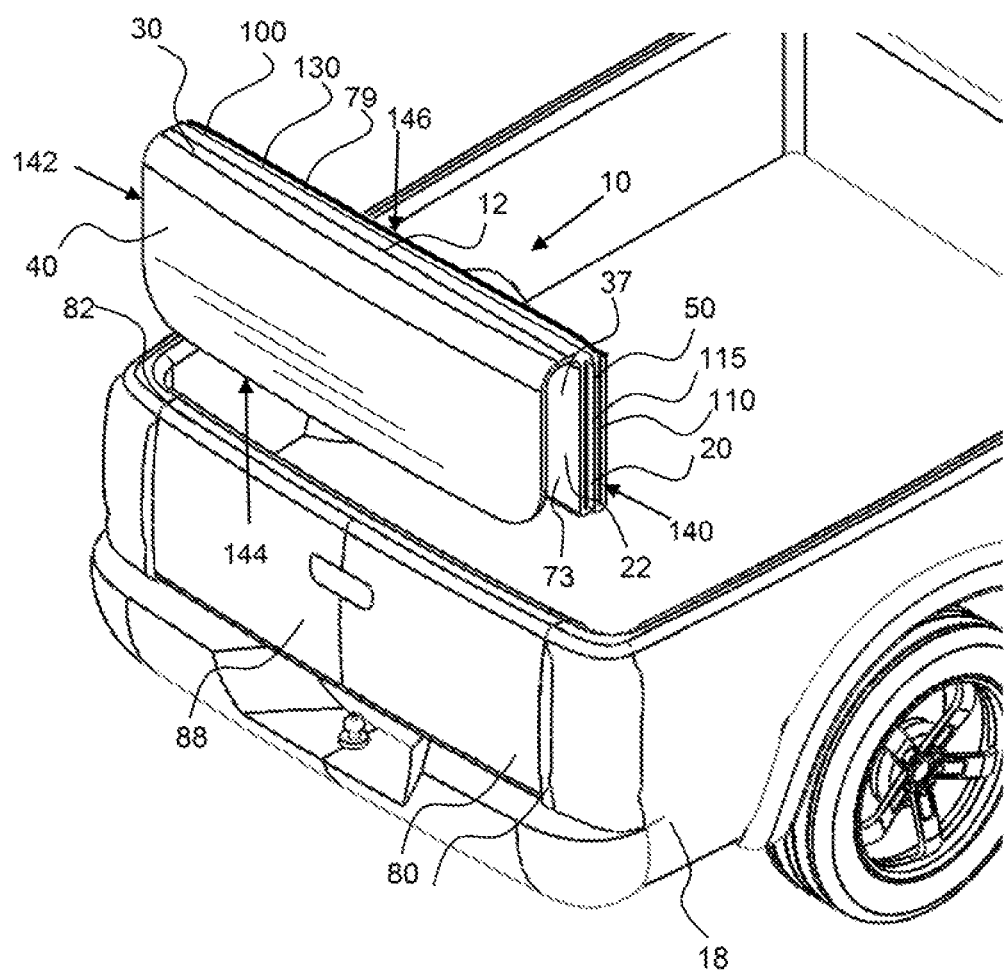
FIG. 2 shows an exemplary convertible tailgate cover above a tailgate.

As shown in FIG. 2, an exemplary convertible tailgate cover 10 is positioned above a tailgate 80 of a vehicle 18, such as a pickup truck as shown. The channel 37 of the tailgate cover slides down over the extended end 82 of the tailgate. The outside cover portion 40 extends down over the outside surface 88 of the tailgate 80 while the inside cover portion 20 extends down over the inside of the tailgate. A coupling portion 30 extends between and connects the outside and inside cover portions. The seat-back portion 50 is folded up and attached to the inside cover portion. The tailgate cover portion 12, comprising the outside cover portion 40 and the inside cover portion 20 and the coupling portion 30, extends over substantially the entire tailgate 80. Whereby at least 70% of the tailgate inner and outer surface are covered by the tailgate cover portion 12. The seat-back portion is a multi-fold seat-back 115, having a first integral pad 110. An integral cup-holder 100, and integral foot rest 130 are stowed within a pocket 79 formed between the seat-back portion and the inside cover portion 20. The convertible tailgate cover 10 has a right side 140, left side 142, bottom 144 and top 146, as viewed from behind the vehicle with the tailgate up.

Figure 3:
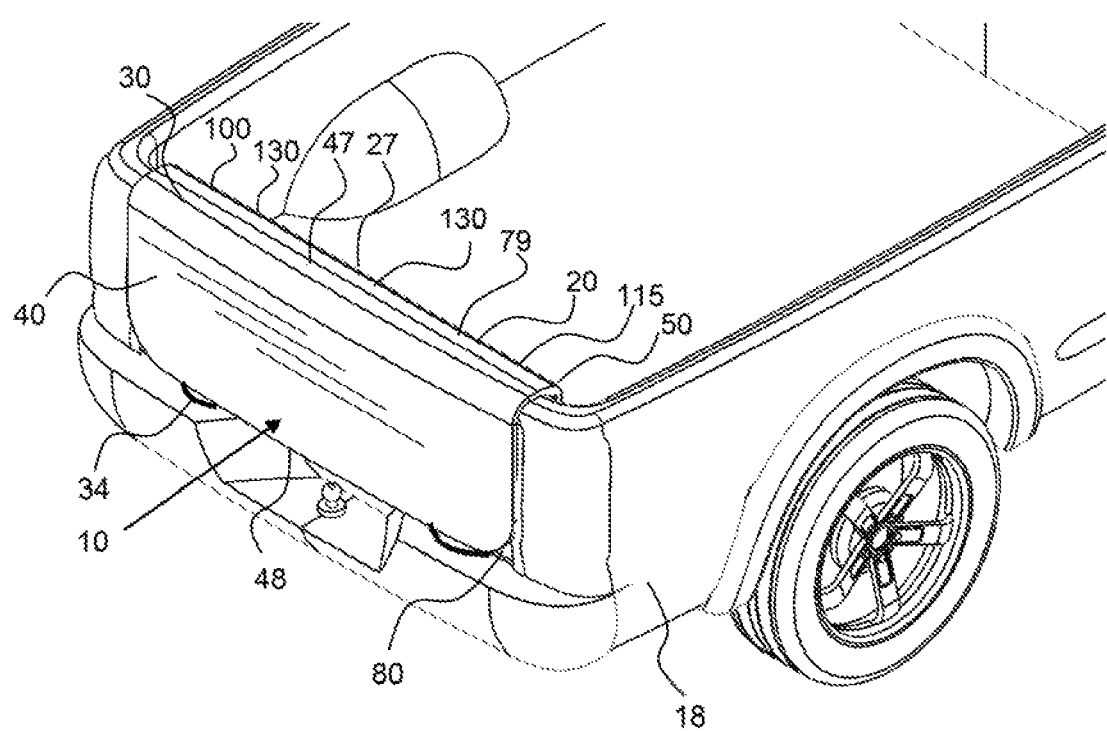
FIG. 3 shows the exemplary convertible tailgate cover shown in FIG. 2 now configured over the tailgate.

As shown in FIG. 3, the exemplary convertible tailgate cover 10 shown in FIG. 2 is now configured over the tailgate 80. The exemplary tailgate cover fits snuggly over the tailgate. Retainer straps 34 extend from the bottom of the outside cover, or bumper end 48 to the hinged end of the inside cover portion 20. The tailgate 80 is almost completely covered by the exemplary convertible tailgate cover 10. The outside cover portion extends from the bumper end 48 to the coupling end 47 and the inside cover portion extends from the hinge end to the to the coupling end 27.

Figure 4:
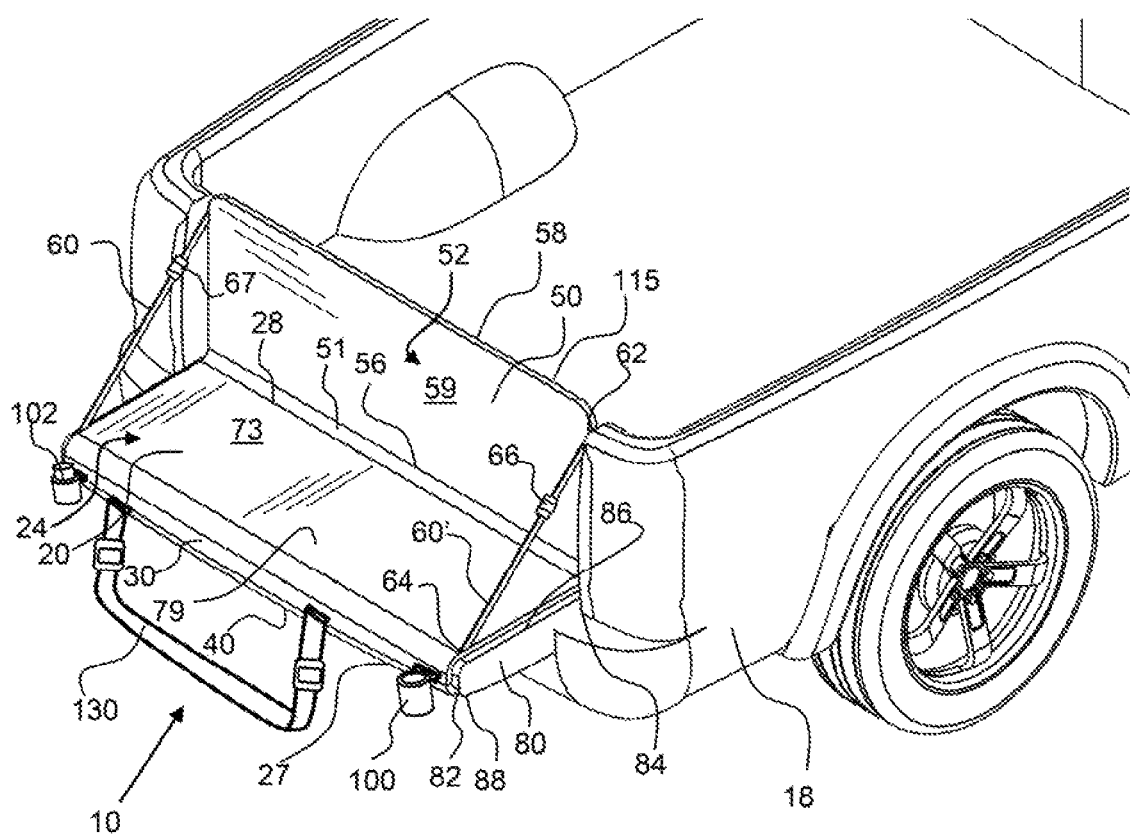
FIG. 4 shows the exemplary convertible tailgate cover shown in FIG. 3, in a seat configuration with the tailgate down and the seat-back portion extended up are secured by the straps.
Figure 9:
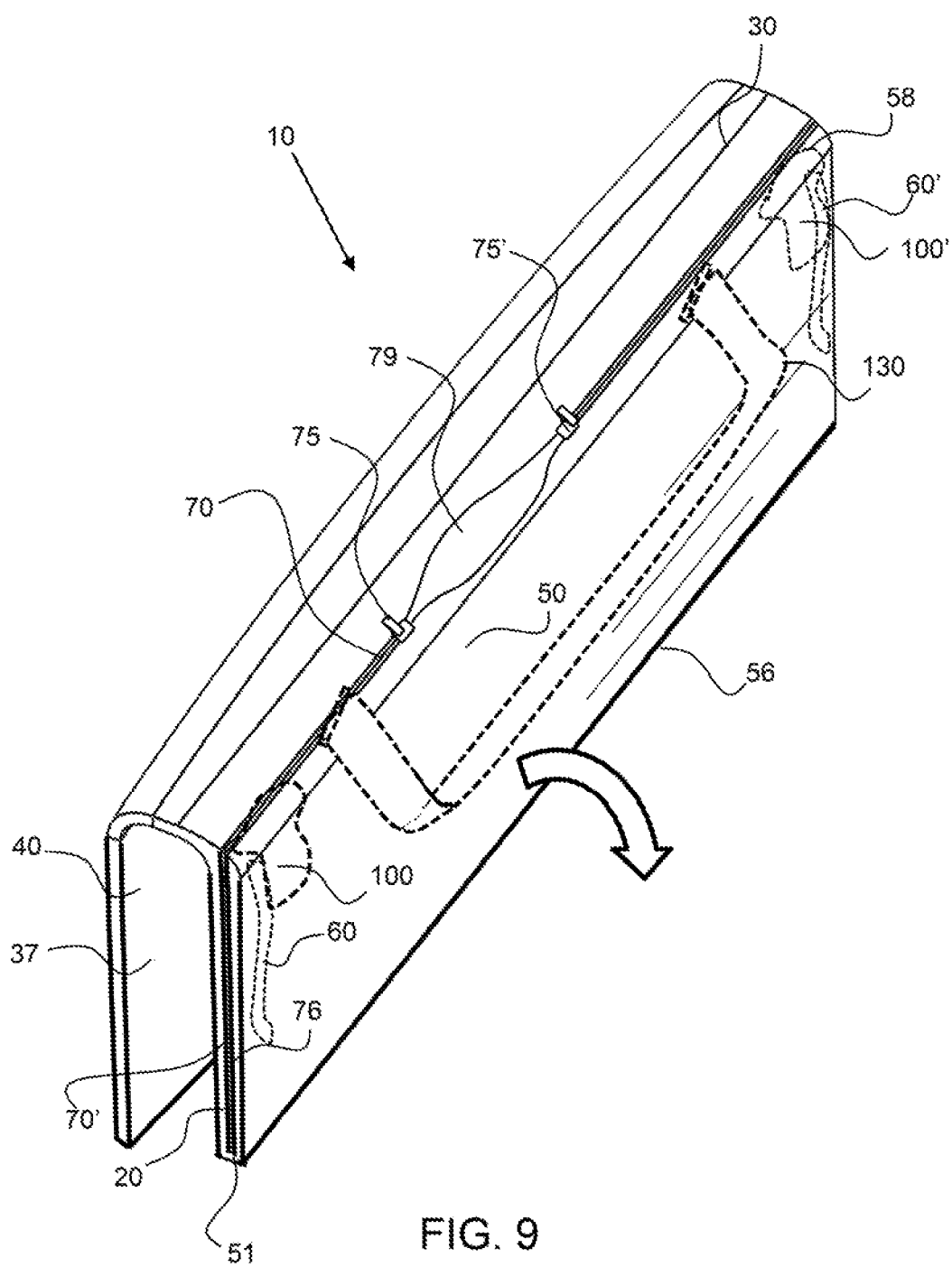
FIG. 9 shows an exemplary convertible tailgate cover with the seat-back portion folded up and attached to the inside cover portion.

As shown in FIG. 4, the exemplary convertible tailgate cover 10 shown in FIG. 3, is now configured in a tailgate down seat configuration with the tailgate 80 rotated down and the seat-back portion 50 rotated up from the inside cover portion and secured by the seat-back straps 60, 60'. The seat-back straps extend from the coupling end 27 of the inside cover portion 20, to the extended end 58 of the seat-back portion 50. The straps 60, 60' may be attached within the pocket 79, as shown in FIG. 9, when the seat-back portion is attached to the inside cover portion to form a pocket. In this way, the straps are not loose and will not damage the vehicle from flapping about when the vehicle is moving. The seat-back portion is rotated up from the hinge portion 51. The seat-back straps 60, 60' comprise a buckle 67 that is an adjustment feature 66 for adjusting the length of the seat-back strap from the first end 62 to the second end 64. The tailgate has an attached end 84 and an extended end 82, as well as an inside surface 86 and an outside surface 88. The tailgate extends substantially horizontally, from the truck and is substantially parallel with the bed of the vehicle. The exemplary tailgate cover 10 substantially covers the entire inside and outside surface of the tailgate, such as at least about 75% of the inside and outside surfaces of the tailgate. The inside cover portion 20 covers the inside surface of the tailgate and when the seat-back portion is rotated to an open configuration, as shown, an exposed surface 24 of the inside portion is exposed. Likewise, when the seat-back portion is rotated to an open seat configuration, as shown, the inside surface 52 of the seat-back portion is exposed. A person could now sit on the inside surface 24 of the inside cover portion 20 with their back resting on the inside surface 52 of the seat-back portion 50. The inside surface 24 of the inside cover portion extends from the left side, to the right side of the tailgate cover and from the coupling end 27 to the hinge end 28, proximal to the hinge portion 51. An integral cup-holder 100 extends out from the pocket 79 and extends from the end of the tailgate to hold a beverage 102. The cup-holders may be attached in any suitable location along the length of the tailgate. Also, the cup-holder may detachable attach convertible tailgate cover for easy removal and stowing in the pocket. An exemplary foot rest 130 extends from the tailgate cover and provides support for a person's feet when sitting on the tailgate. As shown, the exemplary foot rest comprise length adjustment features to enable a person to set the foot rest in a desired position.

Figure 5:
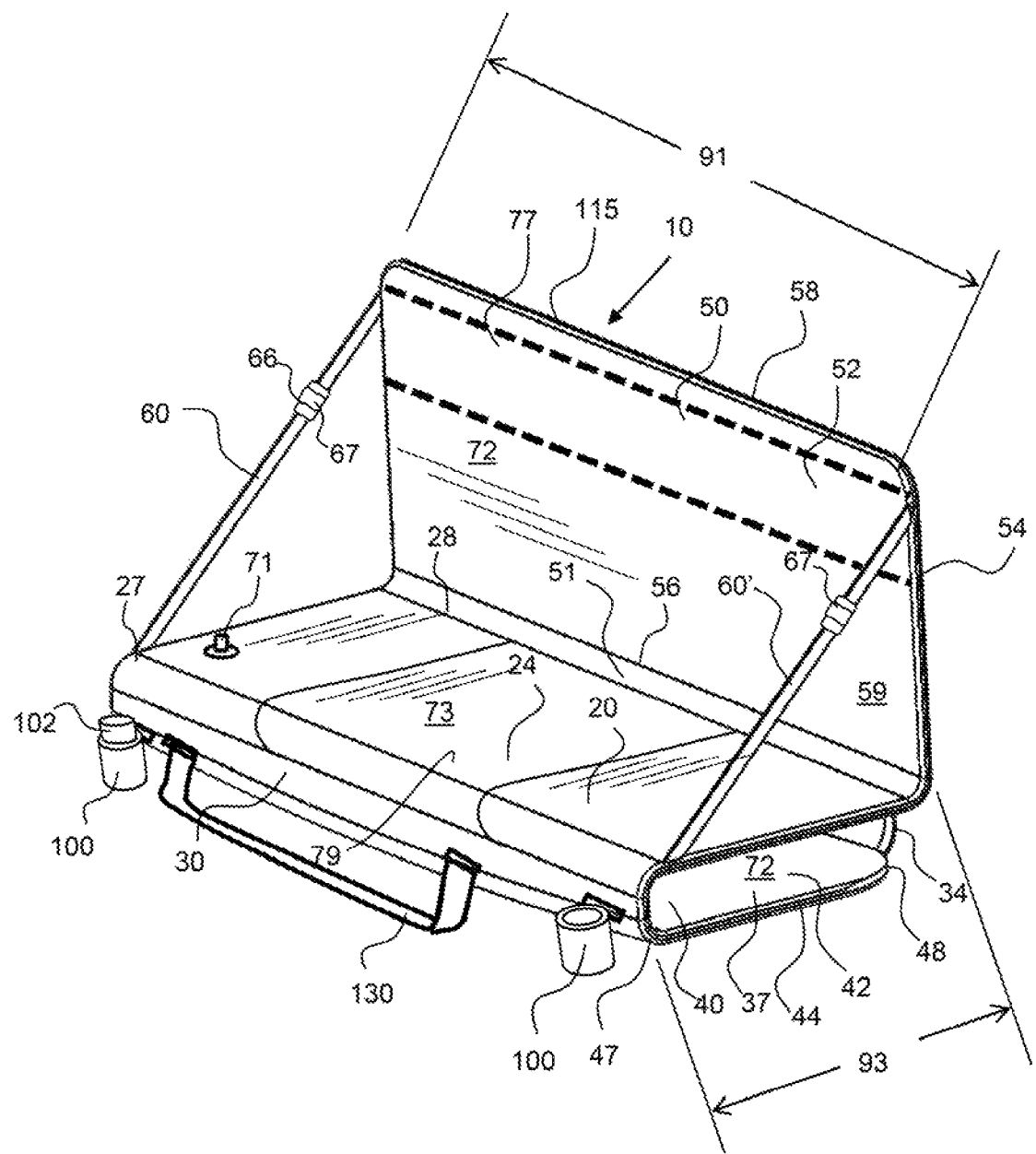
FIG. 5 shows an exemplary convertible tailgate cover in a seat configuration.

As shown in FIG. 5, the exemplary convertible tailgate cover 10 is removed from the tailgate and is configured as a standalone seat. The exemplary convertible tailgate cover may be used as a seat when detached from a tailgate, as the padding 72 in the inside cover portion 20 as well as the outside cover portion 40 will provide comfort for a person sitting thereon. A padding may be fabric, foam, batting, or a bladder, as described herein. The inside cover portion 20 comprises a bladder 73, that has a port 71 for inflating or filling. An inside, outside or seat-back portion may comprise one or more bladders that may be inflated or filled with a fluid, or liquid, such as air or water. The seat-back portion 50 may also comprise padding 72 in the seat-back portion 50. The seat-back portion may also comprise a support member 77, indicated by the dashed lines, within or behind the seat-back cover portion. A support member may be a rigid member to support a person when leaning back on the seat-back portion. A rigid support member may be a rod or strut, for example, that is not flexible, whereby it cannot be folded, when configured in the convertible tailgate cover, without permanent damage. A rigid support member may be detachable from the convertible tailgate cover, whereby it may be inserted into a slot of the seat-back portion, or detachably attached thereto, preferably to the outside surface of the seat-back portion. An exemplary detachable rigid support member may be folded or disassembled when removed from the convertible tailgate cover for easier storage. A rigid support member may be configured within the seat-back portion, wherein there is padding 72 between the support and the inside surface 52 of the seat-back portion. The length of the tailgate cover 91 is greater than the depth 93. The length of the tailgate cover may enable two or even three people to sit thereon. The tailgate surface 42 and the exposed surface 44 of the outside cover portion 40 are shown. A retainer strap 34 is also shown in FIG. 5. The outside cover portion 40 extends from a bumper end 48 to a coupling end 47, proximal to the coupling portion 30. The inside cover portion 30 extends from a hinge end 28 to a coupling end 27, proximal to the coupling portion 30.

Figure 6:
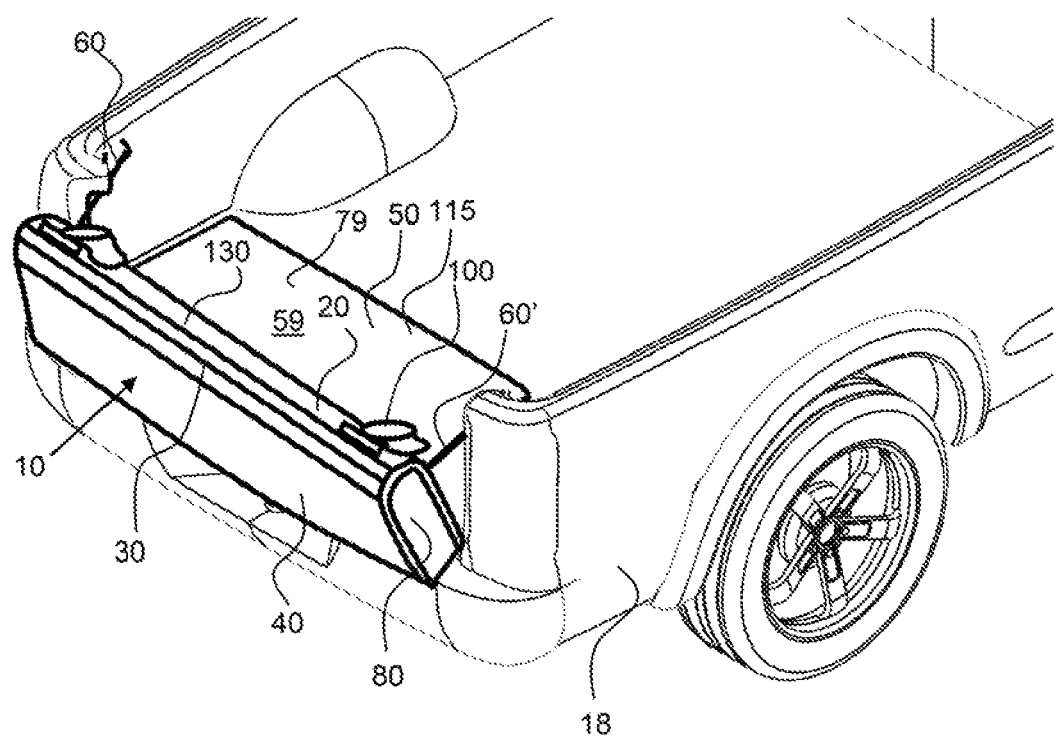
FIG. 6 shows an exemplary convertible tailgate cover configured over a tailgate and in a seat configuration with the seat-back portion extended down into the bed of the truck.

As shown in FIG. 6, an exemplary convertible tailgate cover 10 is configured over a tailgate and provides an alternative seating configuration, with the inside cover portion 20 as well as the tailgate 80, acting as a seat back and the seat-back portion 50 providing a seat within the bed of the truck 18. This truck-bed seat configuration, with the seat-back portion extended down into the bed of the truck may have the tailgate up and latched, or reclined, as shown. The seat-back straps 60, 60' are attached to a fixed location of the vehicle 18, such as a truck bed anchor to maintain the reclined position, as shown. The cup-holder 100 are in a convenient location for holding a beverage in this configuration.

Figure 7:
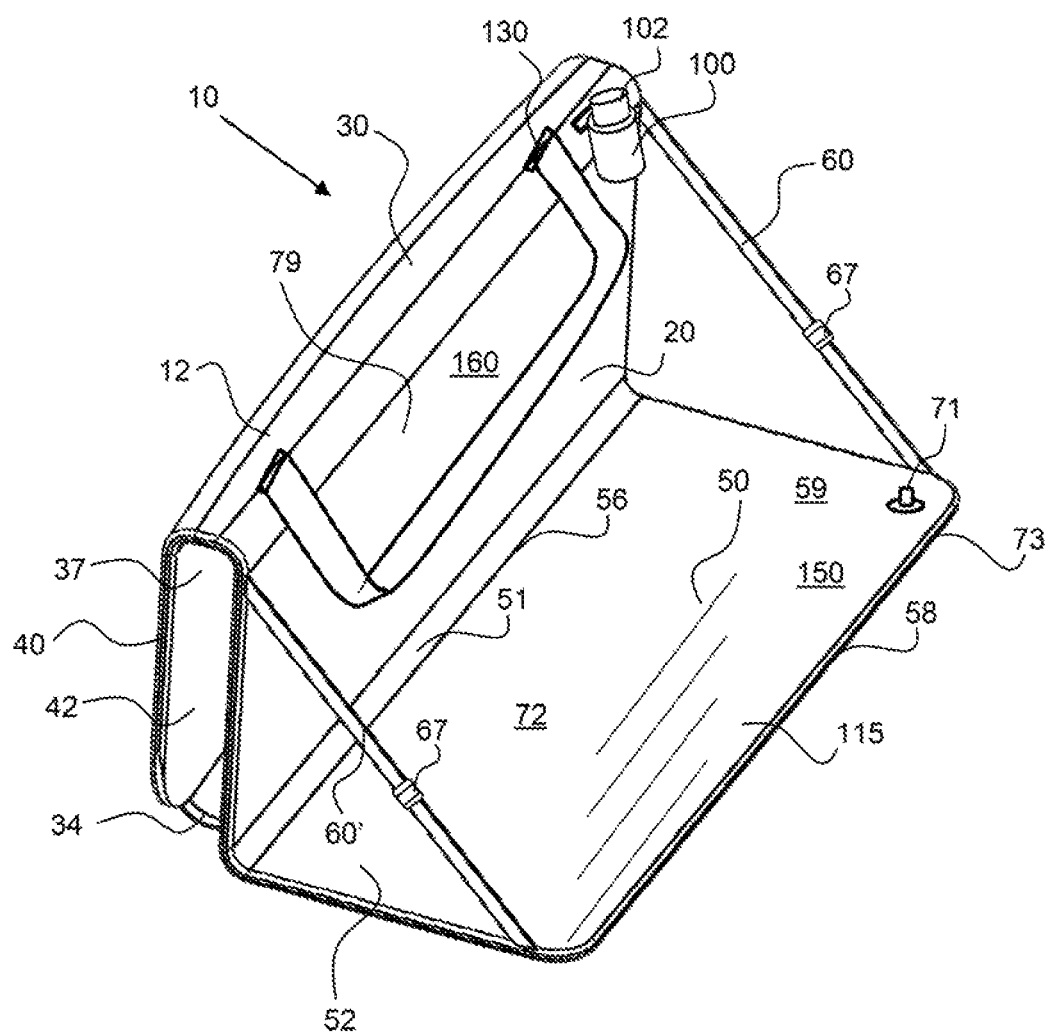
FIG. 7 shows an exemplary convertible tailgate cover configured in a seat configuration with the seat-back portion extended down.

As shown in FIG. 7, the exemplary convertible tailgate cover 10 is configured in a stand-alone seat configuration, with the seat-back portion 50 extended down to provide a seat 150 and the tailgate cover portion 12 acting as a seat-back 160. It is to be understood that the convertible tailgate cover could be rotated 90 degrees, to place the tailgate cover portion on the ground to form a seat as well.

Figure 8:
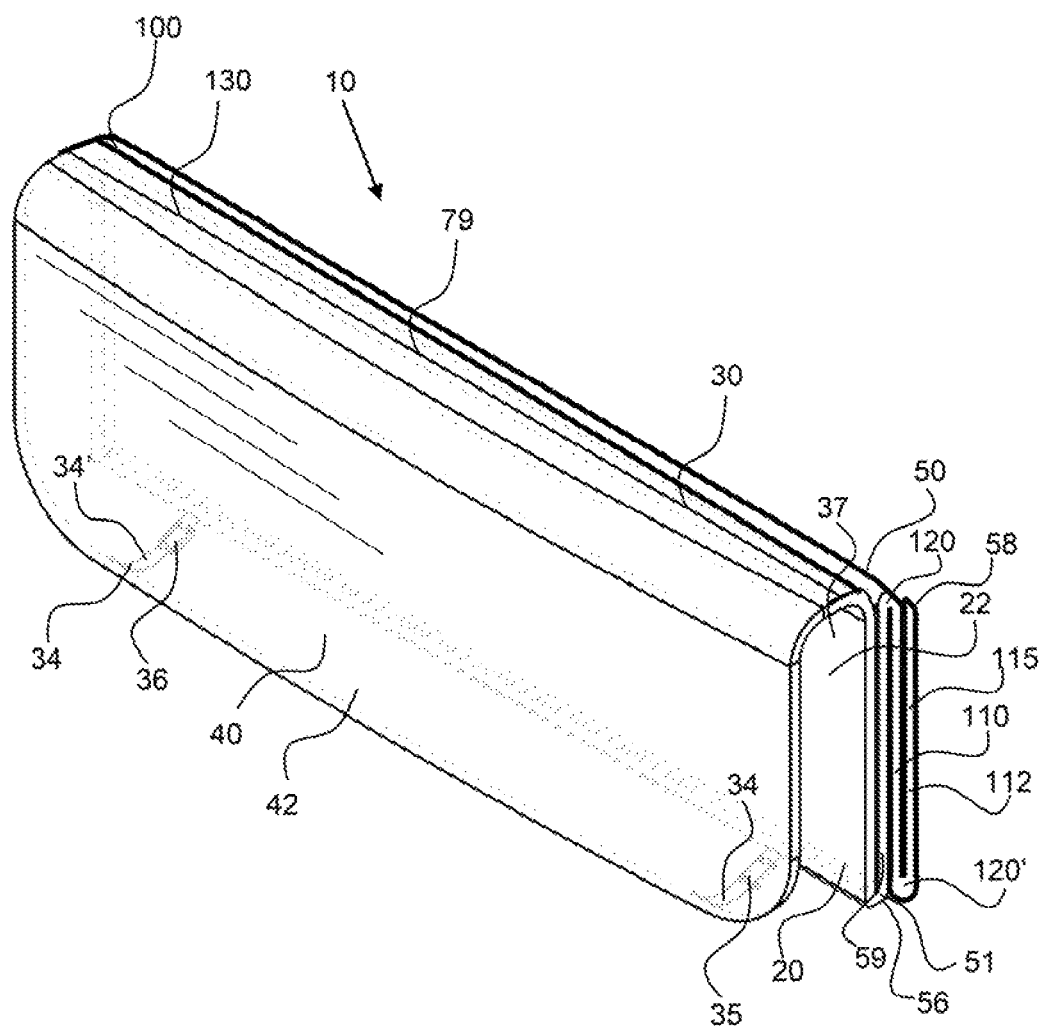
FIG. 8 shows an exemplary convertible tailgate cover with the seat-back portion folded up and attached to the inside cover portion.

As shown in FIG. 8, an exemplary convertible tailgate cover has a channel 37 formed from the outside cover portion 40, the inside cover portion 20 and the coupling portion 30. The channel has an open end for sliding the tailgate cover over a tailgate. The hinge portion 51 enables the seat-back portion 50 to fold out or away from the inside cover portion. The retaining straps 34 extend from the inside cover portion to the outside cover portion or under the tailgate, to secure the tailgate cover to the tailgate. The retaining straps may comprise a buckle 35 or other suitable length adjustment feature. The seat-back portion 50 is a multi-fold seat-back 115 comprising a seat-back pad 59, a first integral pad 110 and a second integral pad 112. The first integral pad is coupled to the seat-back pad 59 by pad hinge 120 and the second integral pad is coupled to the first integral pad by pad hinge 120', on the opposing end of the first integral pad from the seat-back pad, to form an accordion fold. The seat-back pad is attached to the inside cover portion by hinge portion 51, on the hinge end 56 of the seat-back pad.

As shown in FIG. 9, an exemplary convertible tailgate cover 10 is configured with the seat-back portion 50 folded up and attached to the inside cover portion 20 by an attachment feature 70, such as a zipper 75, or hook-and-loop fastener 76. For example, a zipper may extend from the hinge end of the seat-back portion on the left side, up to the top and along the top and then down the right side to the hinge end to form a closure pocket 79. The two zippers 75, 75' are opening the pocket slightly to show the enclosed volume or space of the pocket. Likewise, a strip or a plurality of strips of hook-and-loop fasteners may secure the seat-back portion is a closed configuration. An attachment feature 70 may extend across the tailgate cover along the extended end of the seat-back portion where it couples to the coupling portion of the inside cover portion. Attachment features 70' may also extend down the left and right sides of the seat-back portion and may form a pocket 79, for storing of items. The integral cup-holder, foot rest and seat-back straps are all stowed in a stowed configuration within the pocket 79.

Figure 10:
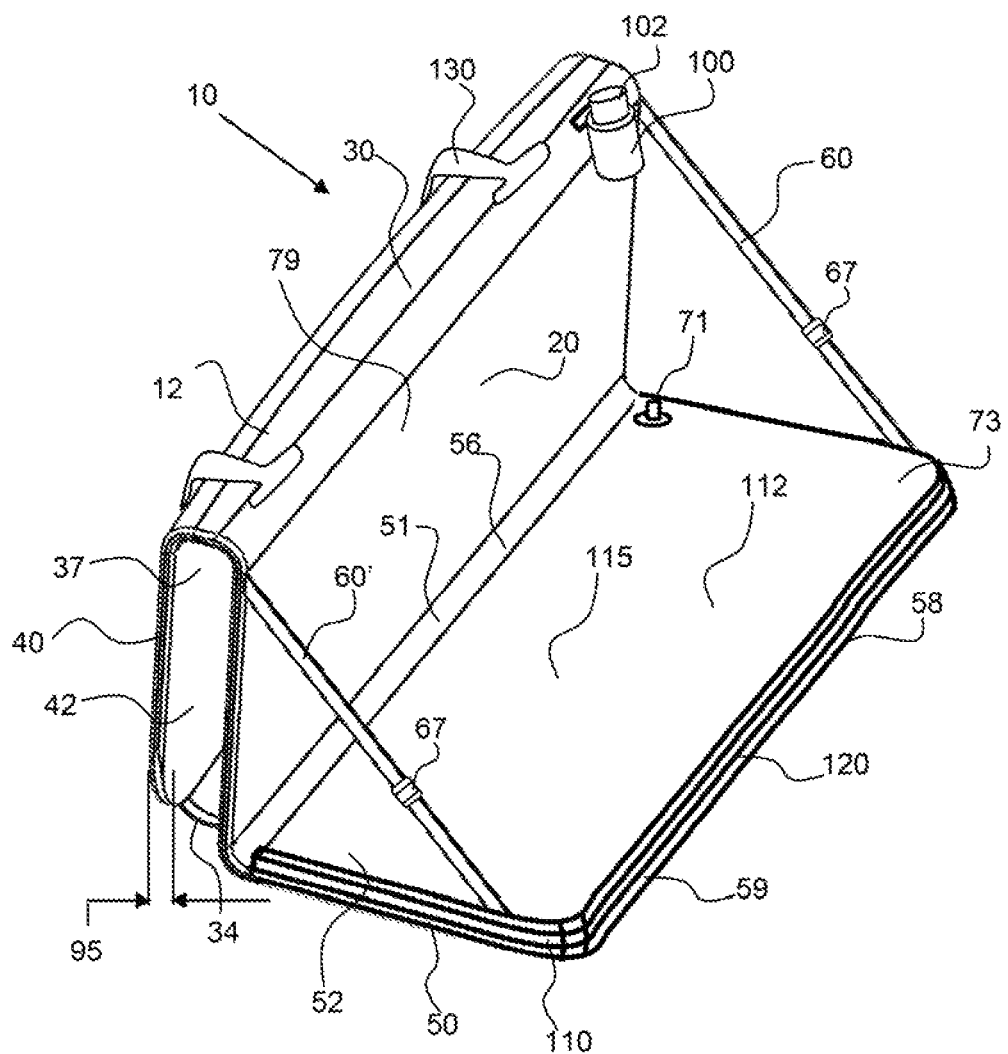
FIG. 10 shows an exemplary convertible tailgate cover configured in a seat configuration with the seat-back portion extended down and having a tri-fold seat-back that is in a stowed configuration.

As shown in FIG. 10, the exemplary convertible tailgate cover 10 is configured in a seat configuration like that shown in FIG. 7, with the multi-fold seat-back portion 115 extended down and in a folded-up or stowed configuration to provide more cushion for sitting. The seat now has three cushions or pads, the seat-back pad 59, at the base or bottom of the seat, the first integral pad 110, in the middle and the second integral pad 112 on the top. A pad hinge 120 couples the seat-back pad 59 to the first integral pad 110 and pad hinge 120' couples the first integral pad 110 to the second integral pad 112.

Figure 11:
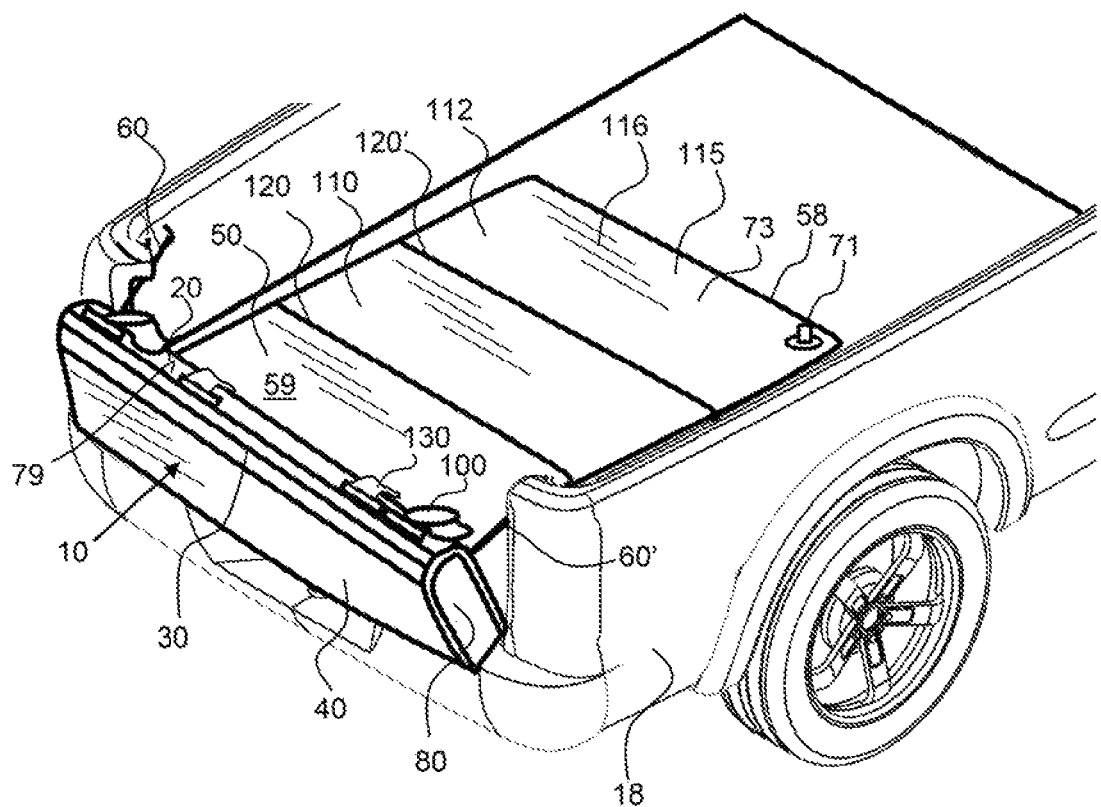
FIG. 11 shows an exemplary convertible tailgate cover configured over a tailgate and in a seat configuration with the seat-back portion extended down into the bed of the truck with a tri-fold seat-back extended out.

As shown in FIG. 11, an exemplary convertible tailgate cover 10 may be configured over a tailgate and provide an alternative seating configuration with the inside cover portion 20, as well as the tailgate 80, acting as a seat-back, as shown in FIG. 6. However as shown in FIG. 11, the tri-fold seat-back 115 is folded out to provide an extended cushioned area that may be used as sleeping pad inside the bed of the truck. The sleeping pad 116, or the tri-fold seat-back extended out comprises three cushions or pads; the seat-back portion 50 and seat-back pad 59 coupled to the inside cover portion 20, the first integral pad 110 that is coupled to and between the seat-back pad 59 and the second integral pad 112. A pad hinge 120 couples the seat-back portion 50 to the first integral pad 110 and pad hinge 120' couples the first integral pad 110 to the second integral pad 112. It is to be understood that the tailgate may be rotated all the way down to provide a sleeping pad configuration.

Figure 12:
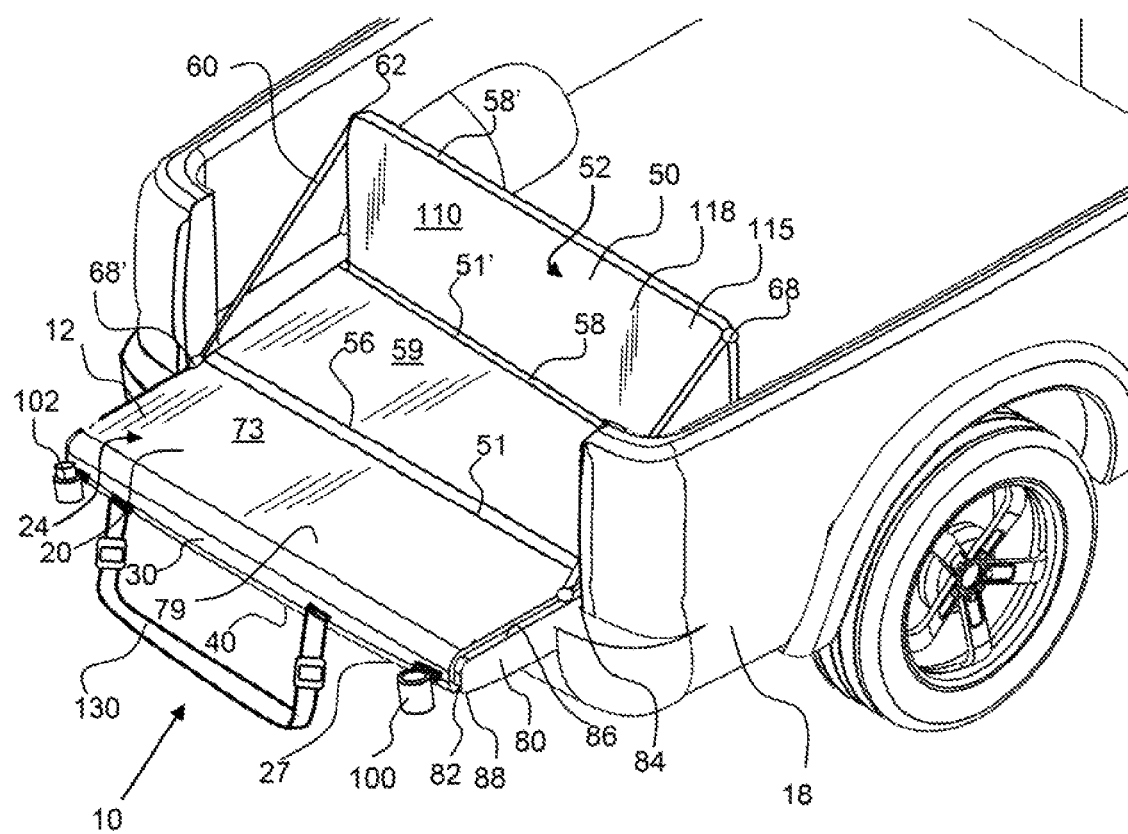
FIG. 12 shows an exemplary convertible tailgate cover configured over a tailgate and with the multi-fold seat-back configured in a seat configuration with the first integral pad forming a seat-back.

As shown in FIG. 12, an exemplary tailgate cover 10 is configured over a tailgate 80 and with the multi-fold seat-back 115 configured in a seat configuration with the first integral pad 110 forming a seat-back 118. The seat-back portion 50 is configured with the seat-back pad 59 down and the first integral pad 110 extended up to form the seat-back. Seat-back straps 60, 60' extend from the extended end 58' of the first integral pad to the tailgate cover portion 12. Attachment features 68, 68' allow the seat-back strap to attach and retain the first integral pad in vertical orientation. The attachment features, such as fabric loops, dips, buckles and the like may be configured along sides, such as proximal the extended end or proximal a hinge end of one of the seat-back pads. This seat configuration allows for more cushioned leg support, with the seat-back pad 59 and the inside cover portion 20 extending out from the seat-back 118.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A convertible tailgate cover comprising:
    a) a tailgate cover portion comprising:
        i) an inside cover portion configured to extend over an inside surface of a tailgate comprising:
            1) a coupling end and a hinge end;
        ii) an outside cover portion configured to extend over an outside surface of said tailgate comprising;
            1) a coupling end; and
            2) a bumper end;
        iii) a coupling portion configured to extend over an extended end of said tailgate and between the coupling ends of the inside cover portion and the outside cover portion;
    b) a seat-back portion extending to an extended end from a hinge portion that couples the seat-back portion to the hinge end of the inside cover portion and comprising a seat-back pad;
    c) a plurality of seat-back straps that extend from the tailgate cover portion to the seat-back portion;
        wherein the seat-back portion can rotate away from the inside cover portion about the hinge portion and be retained in position by said seat-back straps;
    d) an attachment feature configured to retain the extended end of the seat back portion to the tailgate cover portion;
        wherein the attachment feature extends across the extended end of the seat-back portion and down a left side and a right side of the seat-back portion to the hinge portion to form a closable pocket between the seat-back portion and the inside cover portion;
        wherein the convertible tailgate cover is configured to fit over said tailgate and when said tailgate is in an open position, the seat-back portion can be rotated up to produce a seat-back for sitting on said tailgate with the seat-back portion being retained in position by said seat-back straps to provide a seat back.

2. The convertible tailgate cover of claim 1, wherein the inside cover portion and outside cover portion are planar and extend substantially over the entire tailgate.

3. The convertible tailgate of claim 1, wherein the outside cover portion comprise a padding material.

4. The convertible tailgate cover of claim 1, wherein the outside cover portion and inside cover portion comprise a padding material.

5. The convertible tailgate cover of claim 1, wherein the seat-back portion comprises a padding material.

6. The convertible tailgate cover of claim 1, wherein at least one of the seat-back portion, the inside cover portion and the outside cover portion comprise a bladder.

7. The convertible tailgate cover of claim 1, wherein the seat-back portion comprises a rigid support member that extends across the seat-back portion from a left side to a right side.

8. The convertible tailgate cover of claim 1, wherein attachment feature comprises a zipper.

9. The convertible tailgate cover of claim 1, wherein the attachment feature comprises a hook-and-loop fastener.

10. The convertible tailgate cover of claim 1, further comprising an integral cup-holder that is attached within the pocket and is stowed within said pocket in a stowed configuration and extends out from said pocket to a deployed configuration to hold a beverage therein.

11. The convertible tailgate cover of claim 1, further comprising an integral foot rest that is attached within the pocket and is stowed within said pocket in a stowed configuration and extends out from said pocket to a deployed configuration from said pocket to support a person's feet when sitting on the back of a tailgate with said convertible tailgate cover configured over said tailgate.

12. The convertible tailgate cover of claim 1, wherein the plurality of seat-back straps includes a left seat-back strap extends from a left side of the tailgate cover portion to a left side of the seat-back portion and wherein the plurality of seat-back straps also includes a right seat-back strap that extends from a right side of the tailgate cover portion to a right side of the seat-back portion.

13. The convertible tailgate cover of claim 12, wherein each seat-back strap comprises length adjustment feature.

14. The convertible tailgate cover of claim 1, wherein the outside cover portion and inside cover portion consist of a flexible material.

15. The convertible tailgate cover of claim 1, having a length that is at least double a depth and wherein the length is at least 36 inches.

16. The convertible tailgate cover of claim 1, wherein the seat-back portion is a multi-fold seat-back comprising a first integral pad that is coupled to the seat-back pad by a pad hinge and wherein the first integral pad folds out from the seat-back pad about said pad hinge to extend the seat-back portion.

17. A convertible tailgate cover comprising:
a) a tailgate cover portion comprising:
   i) an inside cover portion configured to extend over an inside surface of a tailgate comprising:
      1) a coupling end and a hinge end;
   ii) an outside cover portion configured to extend over an outside surface of said tailgate comprising;
      1) a coupling end; and
      2) a bumper end;
   iii) a coupling portion configured to extend over an extended end of said tailgate and between the coupling ends of the inside cover portion and the outside cover portion;
b) a seat-back portion extending to an extended end from a hinge portion that couples the seat-back portion to the hinge end of the inside cover portion and comprising a seat-back pad;
c) an attachment feature configured to retain the extended end of the seat-back portion to the tailgate cover portion;
d) a plurality of seat-back straps that extend from the tailgate cover portion to the seat-back portion;
   wherein the seat-back portion rotates away from the inside cover portion and be retained in position by said seat-back straps;
   wherein the convertible tailgate cover is configured to fit over said tailgate;
   wherein when said tailgate is in an open position, the seat-back portion rotates up to provide a seat back to configure the convertible tailgate cover into a tailgate seat configuration for sitting on said tailgate with the seat-back portion being retained in position by said seat-back straps to provide a seat back;
   wherein the inside cover portion and outside cover portion are planar and extend substantially over the entire tailgate;
wherein the seat-back portion is a multi-fold seat-back comprising a first integral pad that is coupled to the seat-back pad by a pad hinge and wherein the first integral pad folds out from the seat-back pad about said pad hinge to extend the seat-back portion; and
wherein the attachment feature is configured to retain the extended end of the seat-back portion to the tailgate cover portion;
wherein the attachment feature extends across the extended end of the seat-back portion and down a left side and a right side of the seat-back portion to the hinge portion to form a closable pocket between the seat-back portion and the inside cover portion.

\* \* \* \* \*